United States Patent [19]

Coradi et al.

[11] Patent Number: 4,692,298

[45] Date of Patent: Sep. 8, 1987

[54] ANALOG PROCESS CONTROL SYSTEM TESTING

[75] Inventors: Michael D. Coradi, Harmar Township, Allegheny County; Carl A. Vitalbo, Plum Borough, both of Pa.

[73] Assignee: Westinghouse Electric Corp., Pittsburgh, Pa.

[21] Appl. No.: 788,982

[22] Filed: Oct. 18, 1985

[51] Int. Cl.$^4$ .............................................. G21C 7/36
[52] U.S. Cl. ................................... 376/215; 376/259; 364/550
[58] Field of Search ............... 376/215, 259; 364/492, 364/550, 578, 802, 806

[56] References Cited

U.S. PATENT DOCUMENTS

| | | | |
|---|---|---|---|
| 4,397,021 | 8/1983 | Lloyd | 364/580 |
| 4,509,132 | 4/1985 | Kavaya | 364/578 |
| 4,571,689 | 2/1986 | Hildebrand | 364/550 |

Primary Examiner—Donald P. Walsh
Attorney, Agent, or Firm—Daniel C. Abeles

[57] ABSTRACT

The present invention relates to a method and apparatus for testing analog process protection and control systems which are composed of a plurality of channels each serving to monitor a selected process parameter.

12 Claims, 3 Drawing Figures

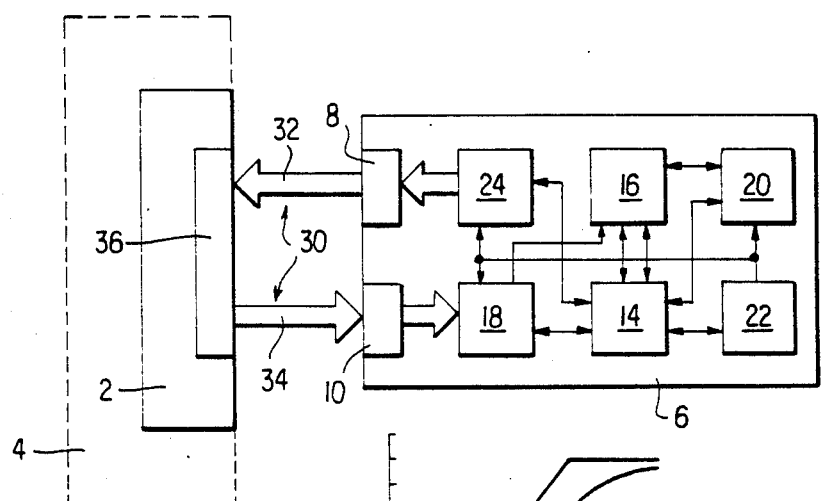
FIG. 1
FIG. 3
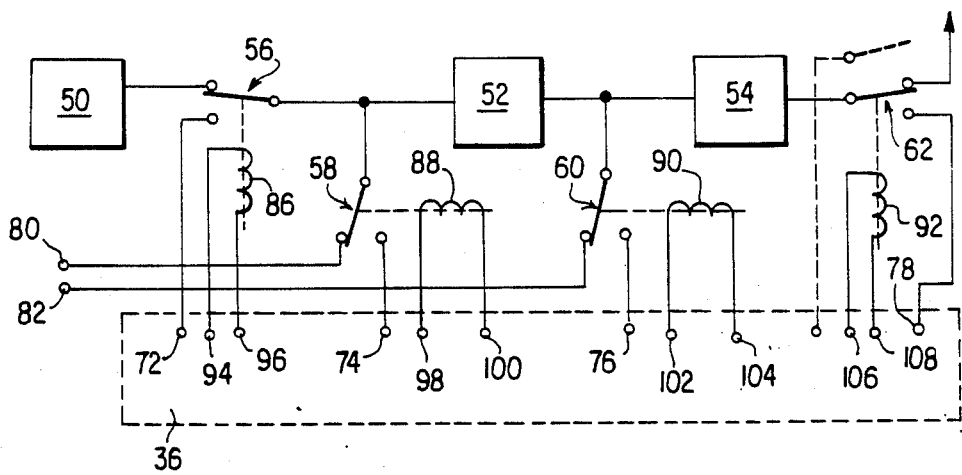
FIG. 2

ANALOG PROCESS CONTROL SYSTEM TESTING

CROSS-REFERENCE TO RELATED APPLICATIONS

Commonly owned United States patent application entitled "Testing Sensor Signal Processors" filed concurrently herewith in the names of Albert W. Crew, William D. Ghrist and Gilbert W. Remley and assigned assignee's U.S. Ser. No. 788,983.

Commonly owned United States patent application serial number 666,696 filed on Oct. 31, 1984.

BACKGROUND OF THE INVENTION

Protection and control systems are employed in a variety of industrial installations including, for example, nuclear reactor power generating plants. Such systems must operate accurately with a high degree of reliability.

It is known to periodically test each channel by supplying to the channel input a signal simulating a malfunction or other condition to which the system should produce a response and observing whether such response is produced.

In certain cases, such as in nuclear reactor power generating installation, the reliability of response to an abnormal condition, which includes avoidance of responses to spurious abnormal condition indications, is improved by monitoring a particular critical condition independently in several, e.g. four, monitoring channels and by comparing the control signals at the outputs of the channels to determine whether an abnormal condition has in fact occurred. By way of example, if any two of the four channels provide output signals indicative of an abnormal condition, it is assumed that the abnormal condition does exist and the system is caused to respond, as by producing a reactor shutdown. Thus, an abnormal condition output signal in one channel is treated as spurious.

It is current practice to manually test such systems by a procedure which takes up to two hours per channel and which involves applying to the channel under test an input signal representing the faulty condition to which that channel is responsive. The appearance of an abnormal condition output signal at the output of the channel under test indicates that the channel is operational.

However, in addition to the fact that such testing procedure is extremely time consuming, this procedure has the drawback that if, during the test, any other associated channel produces a spurious abnormal condition signal, the system will respond as if the abnormal condition really existed.

SUMMARY OF THE INVENTION

It is an object of the present invention to reduce the time required to test such a system.

Another object of the invention is to reduce the possibility of response of the system to spurious output signals during testing.

A further object of the invention is to facilitate display and permanent documentation of the results of each test.

A further object of the invention is to reduce the vulnerability of such tests to human error.

The above and other objects are achieved, according to the present invention, by a method for testing an analog system which controls a process, the system being composed of a plurality of channels, with each channel having an input terminal normally connected for receiving a signal to be monitored, at least one signal monitoring component for deriving a control signal from the signal applied to the input terminal, and an output terminal normally connected in circuit with that at least one component for delivering the control signal to a further device for controlling the process, the method comprising testing each channel individually by: switching the channel input terminal to receive at least one test signal in place of the signal to be monitored; providing the at least one test signal to the channel input terminal; monitoring the response of the at least one component to the at least one test signal; and causing the channel output terminal to present a simulated control signal during the time when the channel input terminal is switched to receive the at least one test signal, the simulated control signal corresponding to the control signal produced when the input and output terminals have their normal connections, and the signal to be monitored has a value indicative of normal process operation.

The objects according to the invention are further achieved by the provision, in a channel of an analog process control system, which channel includes an input terminal normally connected for receiving a signal to be monitored, at least one signal monitoring component having an input normally connected to the input terminal for deriving a control signal from the signal applied to the input terminal, the component further having an output, and an output terminal normally connected in circuit with the component output for delivering the control signal to a process control device, of channel testing means comprising:

test connector means including at least one input connector for providing a test signal and at least one output connector for receiving a test response signal; and electrically controllable switching means including switch members connected in the channel, the switching means being switchable between a normal operating state in which the switch members connect the component input to the input terminal and the component output to the output terminal, and a test state in which the switch members disconnect the component input from the input terminal and the component output from the output terminal and connect the component input to the input connector and the component output to the output connector.

BRIEF DESCRIPTION OF THE DRAWINGS

FIG. 1 is a block diagram of an embodiment of test apparatus for performing channel tests according to the invention.

FIG. 2 is a circuit diagram of a typical system channel equipped with test signal conducting components according to the invention.

FIG. 3 is a plot of waveforms illustrative of one type of testing operation according to the invention.

DESCRIPTION OF THE PREFERRED EMBODIMENTS

FIG. 1 shows, in block diagram form, one channel 2 of an analog process protection and control system 4 which is to be tested according to the invention by means of a microprocessor based data collection and analysis apparatus 6 composed of digital components, a digital/analog converter 8 and an analog/digital converter 10.

The digital components 6 may include, for example, a microprocessor 14 serving as a central processing unit, a disc drive, or other input/output device, 16, a device 18, such as an X-Y plotter, for providing hard copies of test results, a CRT-based graphics terminal 20 with a keyboard, interactive touch screen, or other input member, a power supply 22, and self-calibrating devices 24 for generating various types of test signals such as RTD and resistance ramp simulations.

Apparatus 6 communicates with channel 2 via a multiconductor cable 30 composed of a group of transmitting conductors 32 and a group of receiving conductors 34. Cable 30 mates, at the end associated with channel 2, with a connector 36 mounted on the cabinet containing the analog system 4 of which channel 2 forms a part.

Each channel 2 has its own associated connector and preferably each connector 36 is individually encoded, by one or more jumper wires, each shorting together two connector pins, in a manner which can be interpreted by apparatus 6 so that it will accept only the appropriate test program.

Once cable 30 has been mated with the connector 36 of a selected channel 2, disc drive 16 can be loaded with a selected disc containing the necessary test information for that channel and this information is loaded into microprocessor 14.

FIG. 2 illustrates an exemplary analog system channel equipped to be tested in accordance with the invention. This channel is connected to a signal source 50, i.e. a transducer monitoring a selected parameter such as fluid level in a tank, and is composed of a current-to-voltage converter 52 and a threshold detector 54. In normal operation, the output signal from detector 54 has a high value when the tank fluid level is below a predetermined height and a low value when the fluid level is above that predetermined height. Thus, for example, a low output voltage from detector 54 represents the desired condition.

To allow this channel to be tested in accordance with the invention, it is equipped with a suitable number of remotely controllable switches to disconnect the channel input from transmitter 50 and the channel output from the control arrangement to which it is connected during normal operation, to permit test signals to be applied to the input of converter 52, and to allow the output signals from converter 52 and detector 54 to be monitored.

These switches include:

a switch 56 which normally connects signal source 50 to converter 52 and which is switchable to disconnect converter 52 from source 50 and connect it to a connector pin 72 of connector 36;

a switch 58 which normally connects the input of converter 52 to a test point 80 on the system cabinet and which is switchable to connect the input of converter 52 to a connector pin 74 of connector 36;

a switch 60 which normally connects the output of converter 52 to a test point 82 on the system cabinet and which is switchable to connect the output of converter 52 to a connector pin 76 of connector 36; and a switch 62 which normally connects the output part of threshold detector 54 to its associated control arrangement and which is switchable to connect the output of detector 54 to a connector pin 78 of connector 36.

Test points 80 and 82 are mounted on the cabinet which houses the channel and are accessible during normal operation of the channel. Pins 72, 74, 76 and 78 are part of connector 36 associated with the channel for connection to test apparatus 6.

Switches 56, 58, 60 and 62 are relay switches actuated by relay coils 86, 88, 90 and 92, each coil being connected between two pins 94, 96; 98, 100; 102, 104; and 106, 108 respectively, of connector 36.

Since switches 56, 58, 60 and 62 are normally operated in unison, it would also be possible to incorporate those switches into a single relay having a single operating coil. This, of course, would simplify the structure provided for carrying out the test procedure and reduce the number of connector pins required in connector 36.

In order to test the channel shown in FIG. 2, cable 30 of FIG. 1 would be connected to connector 36, the appropriate disc, or other information storage medium, would be inserted into device 16 and, apparatus 6 would be placed into operation. At the start of operation, the system would first determine whether the correct information storage medium for that channel had been inserted, based, for example, on the particular coding of connector 36.

Thereafter, appropriate test signals are applied via conductors 32 to connector 36 to first actuate relays 86, 88, 90 and 92 and then apply a sequence of preselected test signals to connector pin 72. While those signals are being applied, the response signals on pins 74, 76 and 78 are delivered via conductors 34 and converter 10 to devices 14, 18 and 20 for monitoring of the channel response.

The signals applied to connector pin 72 are generated by devices 24 under control CPU 14 and in response to the information provided by the information storage medium in device 16.

The signals appearing at connector pins 74, 76 and 78 in response to the test signals applied to connector pin 72 can be recorded on the information storage medium in device 16 for subsequent read-out and analysis.

The information contained on the information storage medium inserted into device 16 can include a given nominal value for the response signal at each connector pin 74, 76 and 78 to each signal applied to connector pin 72. If a measured value derived at one of the output pins is not within a predetermined percentage of the given nominal value, apparatus 6 signals the system operator that a malfunction exists in the channel, whereupon appropriate corrective action can be taken. If all output signals are within predetermined limits, the apparatus will automatically restore the channel to its normal operating mode, whereupon cable 30 can be disconnected from connector 36 and testing of the next channel can begin.

During the testing operation, switch 62 is in a position such that the channel output is open-circuited, so that a zero voltage appears at the channel output. If a zero voltage level corresponds to the voltage at the channel output when the channel is monitoring a normal condition, then, during testing, the channel under test will continue to supply to its associated control arrangement a signal indicating that signal source 50 is providing an acceptable output signal.

if this is not the case, i.e. if a zero voltage level at the channel output in indicative of an abnormal condition to which the analog system should respond, then a further relay switch could be provided, as shown in broken lines in FIG. 2, which is operated in parallel with switch 62 by relay coil 92 and which, upon energization of coil 92, connects to the channel output in order to apply thereto, via connector 36, a signal corresponding to a normal condition output from signal source 50.

A system channel, such as that shown in FIG. 2, may be constituted by several cards each containing a respective channel component, and a card containing the relays and associated test points. After cable 30 has been connected to a connector 36, and the appropriate information medium has been inserted into device 16, CPU 14 effects generation of a series of test words which correspond to the addresses of the associated test cards. Recognition of these words actuates the relays of FIG. 2 to connect to the tester to the associated signal points, or test points, of each card. The operator can than select those test points which are to be monitored, which causes the CPU to trigger the generation of a serial stream of bits which is clocked into a shift register to actuate relay coils 86-92.

While the above steps are being performed, the test apparatus can monitor the switching state of all relay contacts 56-62 via safety interrupt lines. If any contact switches from its test state, the test state corresponding to energization of the associated relay coil, the resulting signals on the associated safety interrupt lines will be effective to halt all further testing operation until the proper switch states have been established. At this point, a pre-test signal may be injected to ensure that the correct channel and test points have been engaged.

Once it has been established that proper connections have been made and the relay control switches are in their proper states, apparatus 6 injects test signals provided by devices 24. Such signal could be a ramp signal which is desirable for checking the calibration of lead/lag networks within the channel. However, this can require a time period of up to 2000 seconds.

In order to reduce the duration of such a test, use can be made of an injected signal which corresponds to the signal produced if such a ramp signal is passed through a network equivalent to the inverse of the lead/lag function, so that a corresponding ramp signal will appear at the output of such lead/lag network.

A lead/lag network is a known device in which the phase of the output signal differs in a selected manner from the phase of the input signal.

FIG. 3 illustrates the waveforms of voltage, V, vs. time, T, for an inverse lead/lag signal 110 and a ramp signal 112 which will appear at the output of a particular, properly operating lead/lag network if signal 110 is applied to its input.

To test such lead/lag network forming part of the analog channel under test, the test information stored on the disc loaded into drive 16 contains a representation of waveforms 110 and 112 and information regarding the time delay characteristics of the lead/lag network. To test that network, waveform 110 is generated in devices 24 from the stored information and is applied to the lead/lag network input. The resulting output signal, which should, if the network is operating properly, have the form of waveform 112, is converted to digital form in apparatus 6 and compared, taking account of the inherent time delay of the network, with the stored representation of waveform 112. If the result shows coincidence within certain tolerance limits, the lead/lag network is considered to be operative.

Apparatus 6 samples the analog response of the channel at each selected test point, converts the analog sample to a digital value, and compares this with pre-programmed limits for the signal which is to appear at that test point. If any sampled value is found to be out of the pre-programmed range, apparatus 6 can be programmed to perform the same test a number of, for example, two, additional times before providing an indication of a faulty response. Otherwise, the program provided in apparatus 6 proceeds to the next test point. After all points have been tested, apparatus 6 can generate a clear signal which restores the channel to its normal operational mode. To ensure that the channel has been thus restored, an input signal can be provided which is given an extreme value that would normally cause a change in the output state of the channel, if the channel input were still connected to the test system. If such change does not occur, it is concluded that the channel is clear and testing of the next channel can be performed.

The method and apparatus according to the present invention utilizes a microprocessor based tester which is operative to isolate each channel in turn, verify that the desired channel has entered the test mode, inject analog test signals and monitor the responses of the channel at selected test point, compare actual response values and response times, with pre-programmed nominal values or ranges of values, alert the operator of the occurrence of any faulty response, verify that the channel has been returned to its normal operation mode at the completion of testing and provide display and documentation of the test results.

It will be understood that the above description of the present invention is susceptible to various modifications, changes and adaptations, and the same are intended to be comprehended within the meaning and range of equivalents of the appended claims.

We claim:

1. A method for testing an analog system which controls a process, the system being composed of a plurality of channels, with each channel having an input terminal normally connected for receiving a signal to be monitored, at least one signal monitoring component for deriving a control signal from the signal applied to the input terminal, and an output terminal normally connected in circuit with that at least one component for delivering the control signal to a further device for controlling the process, said method comprising testing each channel individually by: switching the channel input terminal to receive at least one test signal in place of the signal to be monitored; providing the at least one test signal to the channel input terminal; monitoring the response of the at least one component to the at least one test signal; and causing the channel output terminal to present a simulated control signal during the time when the channel input terminal is switched to receive the at least one test signal, the simulated control signal corresponding to the control signal produced when the input and output terminals have their normal connections, and the signal to be monitored has a value indicative of normal process operation.

2. A method as defined in claim 1 wherein each channel is provided with electrically controllable switches connected, respectively, to the channel input terminal and the output of the component, and said step of switching comprises electrically controlling the switches.

3. A method as defined in claim 2 wherein said step of monitoring is carried out by means of a data collection and analysis apparatus, each channel is provided with a multi-pin connector, and the apparatus is provided with a multiconductor cable which is connectable to each channel for carrying out said method.

4. A method as defined in claim 3 wherein said step of providing at least one test signal is carried out by generating the test signal in the data collection and analysis apparatus.

5. A method as defined in claim 4 wherein the simulated control signal is generated in the data collection and analysis apparatus.

6. A method as defined in claim 5, further comprising connecting the cable of the data collection and analysis apparatus to the connector of a selected channel, and then performing said step of switching, before said steps of providing, monitoring and causing, by conducting from the apparatus to the selected channel a switching signal for controlling the switches.

7. A method as defined in claim 6 wherein said step of switching further comprises disconnecting the output terminal from the at least one component.

8. In a channel of an analog process control system, which channel includes an input terminal normally connected for receiving a signal to be monitored, at least one signal monitoring component having an input normally connected to the input terminal for deriving a control signal from the signal applied to the input terminal, the component further having an output, and an output terminal normally connected in circuit with the component output for delivering the control signal to a process control device, the improvement comprising channel testing means comprising:

test connector means including at least one input connector for providing a test signal and at least one connector for receiving a test response signal; and electrically controllable switching means including switch members connected in said channel, said switching means being switchable between a normal operating state in which said switch members connect said component input to said input terminal and said component output to said output terminal, and a test state in which said switch members disconnect said component input from said input terminal and said component output from said output terminal and connect said component input to said input connector and said component output to said output connector.

9. A channel as defined in claim 8 wherein said switching means comprise a control member for switching said switch members into their test state in response to a test initiation signal, and said connector means comprise a test initiation signal connector connected to said control member for supplying a test initiation signal thereto.

10. A channel as defined in claim 9 wherein said switching means comprise a relay composed of a coil constituting said control member and relay switches constituting said switch members.

11. A channel as defined in claim 9 wherein said switching means comprise a further switch member connected to said connector means and switchable into a test state by said control member for applying a selected signal to said output terminal.

12. A channel as defined in claim 8 wherein said connector means are coded in an electrically detectable manner to identify said channel.

* * * * *